(12) United States Patent
Xiong

(10) Patent No.: US 12,554,407 B2
(45) Date of Patent: Feb. 17, 2026

(54) MEMORY CONTROLLERS, DEVICES, AND STORAGE MEDIUMS AND OPERATION METHODS THEREOF TO MAP BLOCKS HAVING THE SAME PHYSICAL NUMBER TO DIFFERENT LOGICAL NUMBERS

(71) Applicant: Yangtze Memory Technologies Co., Ltd., Hubei (CN)

(72) Inventor: Tao Xiong, Hubei (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 10 days.

(21) Appl. No.: 18/635,853

(22) Filed: Apr. 15, 2024

(65) Prior Publication Data
US 2025/0224875 A1 Jul. 10, 2025

(30) Foreign Application Priority Data
Jan. 5, 2024 (CN) .......................... 202410025050.9

(51) Int. Cl.
*G06F 12/00* (2006.01)
*G06F 3/06* (2006.01)

(52) U.S. Cl.
CPC ............ *G06F 3/0613* (2013.01); *G06F 3/064* (2013.01); *G06F 3/0679* (2013.01)

(58) Field of Classification Search
CPC ....... G06F 3/0613; G06F 3/064; G06F 3/0679
USPC ......................................................... 711/103
See application file for complete search history.

(56) References Cited

U.S. PATENT DOCUMENTS

2018/0232181 A1* 8/2018 Zhou ..................... G06F 3/0604

FOREIGN PATENT DOCUMENTS

CN 110308867 A * 10/2019 ........... G06F 3/0614

* cited by examiner

*Primary Examiner* — Mardochee Chery
(74) *Attorney, Agent, or Firm* — HANLEY, FLIGHT & ZIMMERMAN, LLC

(57) ABSTRACT

The present application discloses an operation method of a memory controller, a device, and a storage medium. The controller is coupled to at least one memory, and the memory includes a plurality of planes each including a plurality of blocks. The method includes: acquiring physical numbers of N blocks in the at least one memory; mapping a physical number of each of the N blocks according to a global number of a plane in which each of the N blocks is located, so as to obtain a logical number of each of the N blocks; and grouping the N blocks according to the logical number of each of the N blocks to obtain at least two superblocks. The above method may map at least two blocks having the same physical number to different logical numbers.

20 Claims, 12 Drawing Sheets

MEMORY CONTROLLERS, DEVICES, AND STORAGE MEDIUMS AND OPERATION METHODS THEREOF TO MAP BLOCKS HAVING THE SAME PHYSICAL NUMBER TO DIFFERENT LOGICAL NUMBERS

CROSS-REFERENCE TO RELATED APPLICATIONS

The present application claims the benefit of priority to China Application No. 202410025050.9, filed on Jan. 5, 2024, the content of which is incorporated herein by reference in its entirety.

TECHNICAL FIELD

Examples of the present application relate to the technical field of memory technology, and more particular, to an operation methods of memory controllers, devices, and storage mediums.

BACKGROUND

With the development of memory technology, use scenarios of a memory system become increasingly complex, imposing increasingly high requirements on the stability of the memory system.

Write consistency is an important index for measuring the stability of the memory system. That is, large fluctuations in write rates during data writing to the memory system are not allowed.

BRIEF DESCRIPTION OF THE DRAWINGS

FIG. 6 is a schematic diagram of a distribution situation of physical numbers of individual blocks in at least one memory provided by an example of the present application;

FIG. 7 is a schematic diagram of system block grouping provided by an example of the present application;

FIG. 8 is a schematic diagram of a mapping relationship between physical numbers and logical numbers provided by an example of the present application;

DETAILED DESCRIPTION

In order to make the purposes, technical solutions and advantages of the present application clearer, examples of the present application will be further described below in detail in conjunction with the drawings.

A plurality of blocks in the memory system are grouped into one superblock for unified management during data reading and writing. In order to guarantee the write consistency of the memory system, it is necessary to guarantee the consistency in the write rates of individual superblocks.

Figure 1:
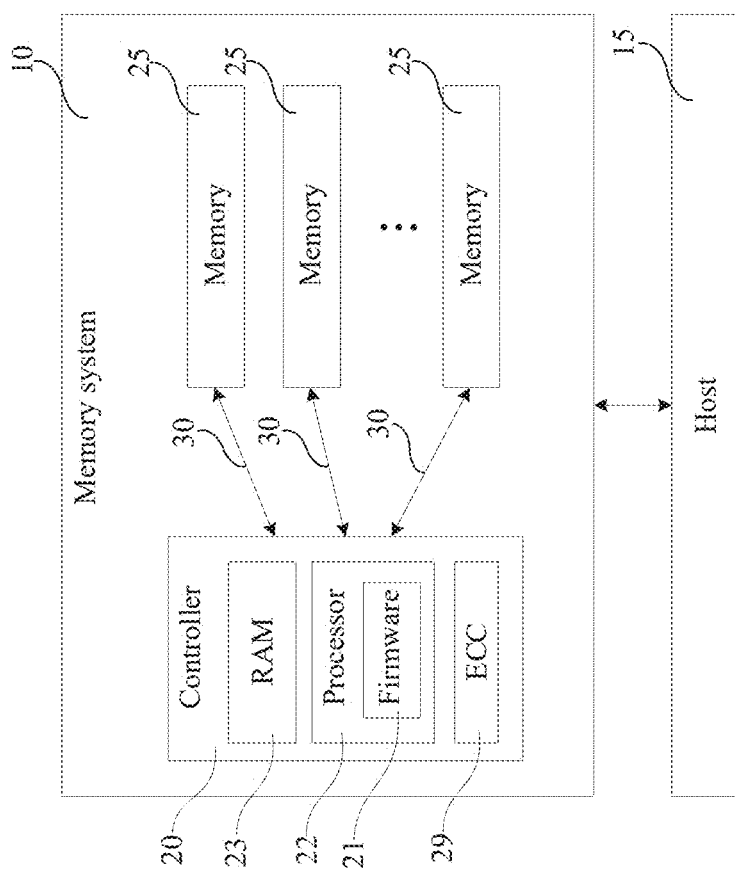
FIG. 1 is a block diagram of a system having a memory system provided by an example of the present application.

Please refer to FIG. 1, which illustrates a block diagram of a system having a memory system 10 provided by an example of the present application. In some examples, the system may be a mobile phone, a desktop computer, a laptop computer, a tablet computer, a vehicle computer, a gaming console, a printer, a positioning device, a wearable electronic device, a smart sensor, a virtual reality (VR) device, an Augmented Reality (AR) device, or any other suitable electronic devices having memory systems therein. The memory system 10 may comprise a controller 20 and one or more semiconductor memories 25. Each semiconductor memory 25 (hereinafter abbreviated to "memory") may be a die of a flash (e.g., a Not AND (NAND) flash, a Not OR (NOR) flash, etc.). The memory system 10 can communicate with a host 15 through the controller 20, wherein the controller 20 can be connected to the one or more memories 25 via one or more channels 30. In some examples, each memory 25 may be managed by the controller 20 via the one or more channels 30.

In some examples, the host 15 may include a processor of an electronic device, e.g., a Central Processing Unit (CPU), or a System on Chip (SoC), such as an Application Processor (AP). The host 15 can perform at least one of the following: send data to be stored in the memory system 10 or retrieve data from the memory system 10.

In some examples, the controller 20 may process input/output (I/O) requests received from the host 15 to ensure data integrity and effective storage, and manage the memory 25. To perform these tasks, the controller 20 can run firmware 21, which can be executed by one or more processors 22 (e.g., a microcontroller unit, CPU) of the controller 20. For example, the controller 20 can run the firmware 21 to map a logical address (e.g., an address utilized by the host associated with host data) to a physical address in the memory 25 (e.g., an actual location where the data is stored). The controller 20 also runs the firmware 21 to manage defective memory blocks in the memory 25, wherein the firmware 21 can remap the logical address to a different physical address, i.e., move the data to a different physical address. The controller 20 further comprises a memory 23 (e.g., a Read-Only Memory (ROM), a Random-Access Memory (RAM), and a cache, etc., wherein the RAM is taken as an example of the memory in FIG. 1 for illustration only). The memory 23 can be configured to store various types of root meta used by the firmware 21. In some examples, the controller 20 can also perform error recovery through an Error Correction Code (ECC) engine 29. The ECC is configured to detect and correct a raw bit error that occurs within each memory 25.

In some examples, the channel 30 can provide data and control communication between the controller 20 and each memory 25 via a data bus. The controller 20 can select one of the memories 25 according to a chip enable signal.

Figure 2:
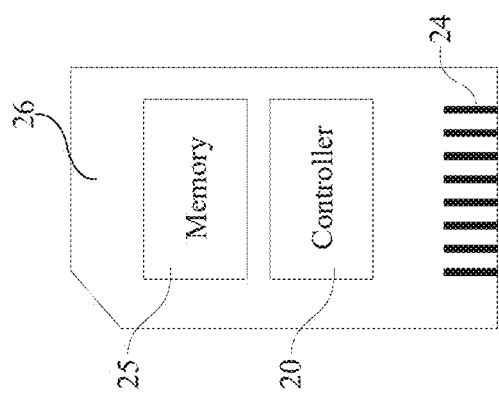
FIG. 2 is a schematic diagram of a memory card provided by an example of the present application.
Figure 3:
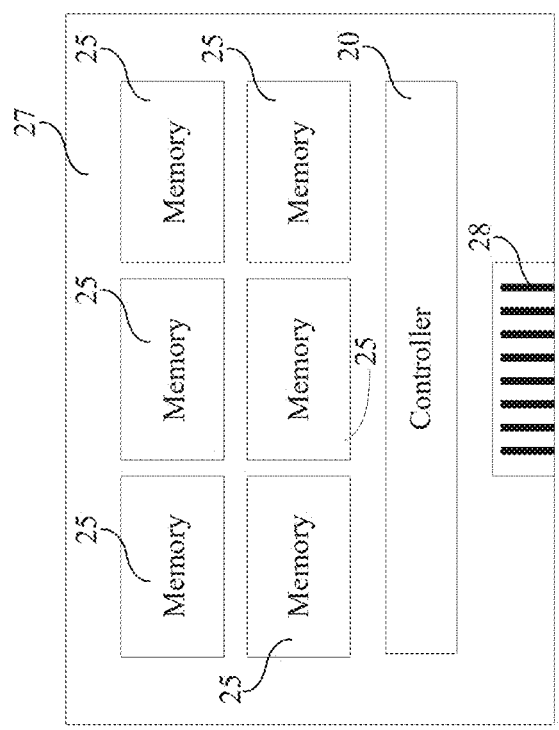
FIG. 3 is a schematic diagram of a solid state drive provided by an example of the present application.

In some examples, the controller 20 and the one or more memories 25 may be integrated into various types of memory systems, e.g., be included in the same package, such as a Universal Flash Storage (UFS) package or an embedded Multi Media Card (eMMC) package. That is, the memory system 10 can be implemented and packaged into different types of end electronic products. In one example as shown in FIG. 2, the controller 20 and a single memory 25 can be integrated into a memory card 26. The memory card 26 may include a PC (Personal Computer Memory Card International Association (PCMCIA)) card, a Compact Flash (CF) card, a Smart Media (SM) card, a memory stick, a Multi-Media card (MMC, RS-MMC, MMCmicro), an SD card (SD, miniSD, microSD, SDHC), a UFS, etc. The memory card 26 may further comprise a memory card connector 24 coupling the memory card 26 with a host (e.g., the host 15 in FIG. 1). In another example as shown in FIG. 3, the controller 20 and a plurality of memories 25 may be integrated into a Solid State Drive (SSD) 27. The SSD 27 may further comprise an SSD connector 28 coupling the SSD 27 with a host (e.g., the host 15 in FIG. 1).

The above-mentioned memory system 10 may include one or more of a universal flash memory, an embedded multi-media card, a UFS-based Multichip Package (uMCP) memory, an eMMC-based Multichip Package (eMCP) memory, a solid state drive, and the like, which are not limited in the present application.

Figure 4:
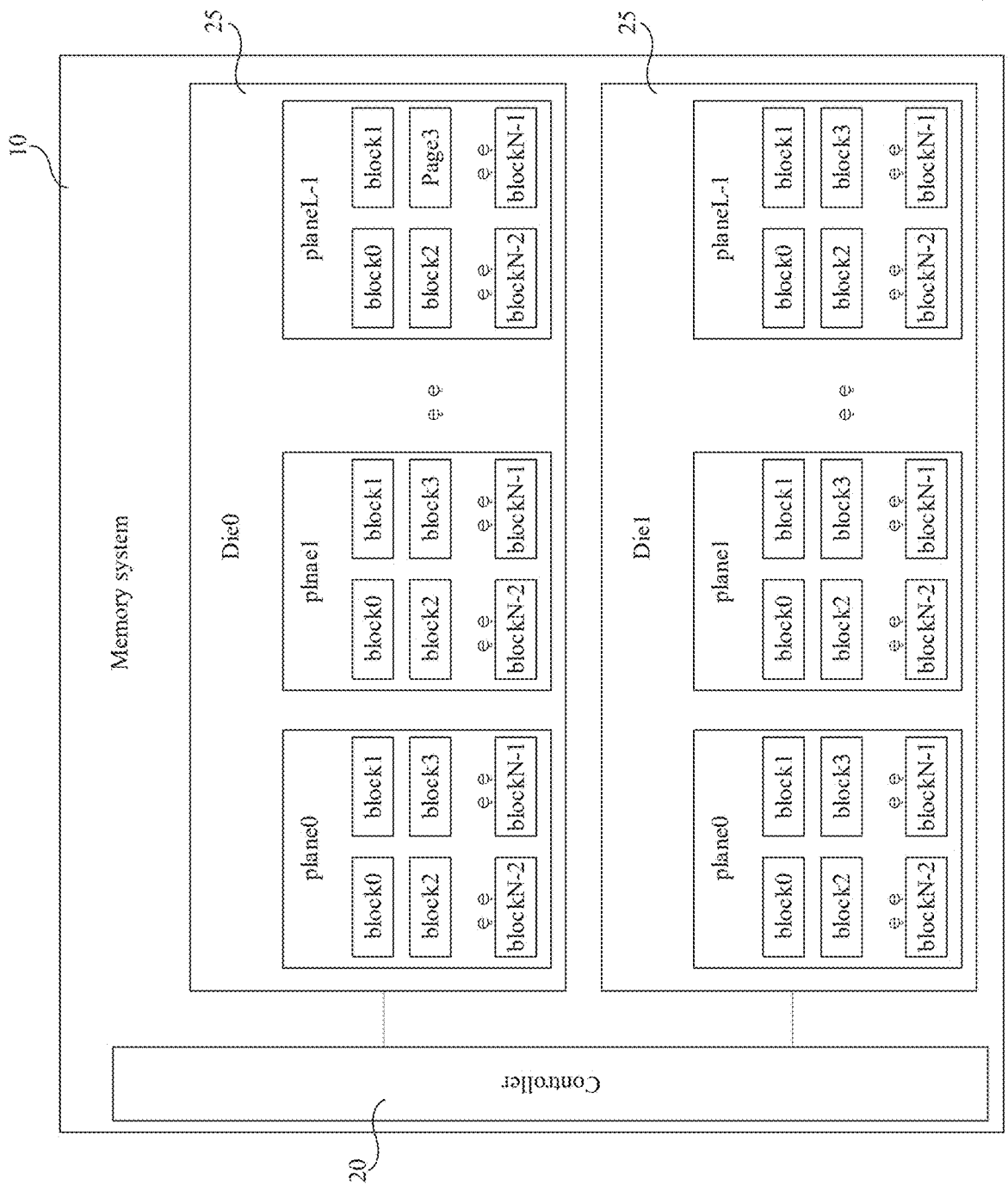
FIG. 4 is a schematic diagram of an internal structure of a memory system provided by an example of the present application.

In some examples, as shown in FIG. 4, the memory system 10 comprises a plurality of memories 25 (Die0 and Die1), each memory 25 comprising a plurality of planes (plane0, plane1, . . . , planeL−1), and each plane comprising a plurality of blocks (block0, block1, . . . , blockN−1), wherein N and L are both integers greater than 1.

In some examples, in order to improve read and write rates, a plurality of blocks on different planes in the memory system may be managed as a single superblock. Each block is configured with a physical number to distinguish different blocks on the same plane when the memory system is shipped from the factory, e.g., "0, 1, 2, 3, . . . , N−2, and N−1" in FIG. 4. Therefore, the blocks in the memory system can be grouped according to physical numbers. For example, blocks having the same physical number are grouped into one superblock (for example, all blocks "block0" in FIG. 4 are grouped into a superblock 0, all blocks "block1" are grouped into a superblock 1, . . . , and all blocks "blockN−1" are grouped into a superblock N−1). For another example, blocks having predetermined physical numbers are grouped into one superblock (for example, all the blocks "block0" and all the blocks "block1" in FIG. 4 are grouped into one superblock). Furthermore, during data writing, data is written to all the blocks in one superblock at the same time, and during data reading, data is read from all the blocks in one superblock at the same time.

However, since there are some blocks in the memory system that are set according to physical numbers and cannot be used to store host data (for example, blocks used to store a code and a configuration parameter of a NAND flash), if the superblock is grouped according to the above method, some superblocks may have more blocks to which the host data cannot be written.

In the above case, in order to guarantee the consistency in write rates of the individual superblocks, blocks of an Over-Provisioning (OP) are used to replace the above blocks to which the host data cannot be written. However, the reduction of the over-provisioning in the memory system may affect the service life and read-write performance of the memory system.

Figure 5:
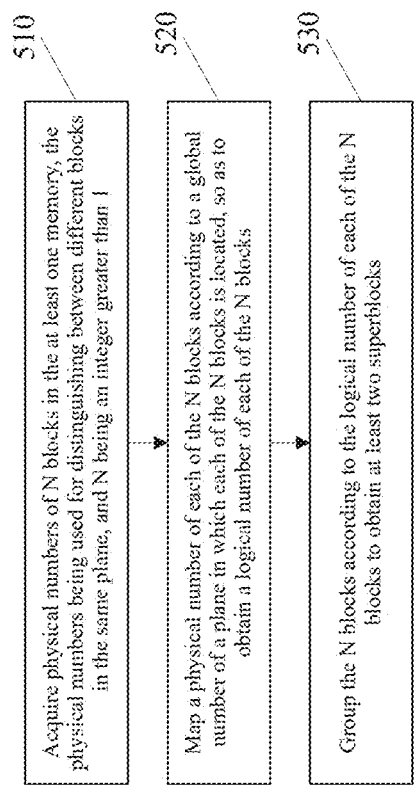
FIG. 5 is a flow diagram of an operation method of a memory controller provided by an example of the present application.

Please refer to FIG. 5, which illustrates a flow diagram of an operation method of a memory controller provided by an example of the present application. The execution subject of the operations of the method may be the memory system 10 in the above example, and furthermore, the execution subject of the operations of the method may be the controller 20 in the memory system 10. The controller is coupled to at least one memory, the memory comprises a plurality of planes, each plane comprises a plurality of blocks, and the method may comprise at least one of following operations 510-530.

In operation 510, acquire physical numbers of N blocks in the at least one memory, the physical numbers being used for distinguishing between different blocks in the same plane, and N being an integer greater than 1.

In some examples, for a particular block in a particular plane, a physical number of the block is related to an actual physical location of the block in the plane. Furthermore, in some examples, a physical number of a block may be regarded as a physical address of the block, which is used to indicate an actual location of the block in the plane in which the block is located. In an example, referring to FIG. 4, "0, 1, 2, 3, . . . , N−2, and N−1" in FIG. 4 may be used as physical numbers for distinguishing between different blocks in the same plane.

In some examples, the memory is a die of a flash (e.g., a NAND flash, and a NOR flash, etc.). In the examples of the present application, a die of the NAND flash is taken as an example of the memory for illustration only.

In some examples, the N blocks comprise a plurality of unavailable blocks having the same physical number, and the unavailable blocks refer to blocks unavailable for writing the host data.

In some examples, the unavailable blocks comprise bad blocks, and the bad blocks refer to blocks that do not support data read, write, or erase.

Figure 6:
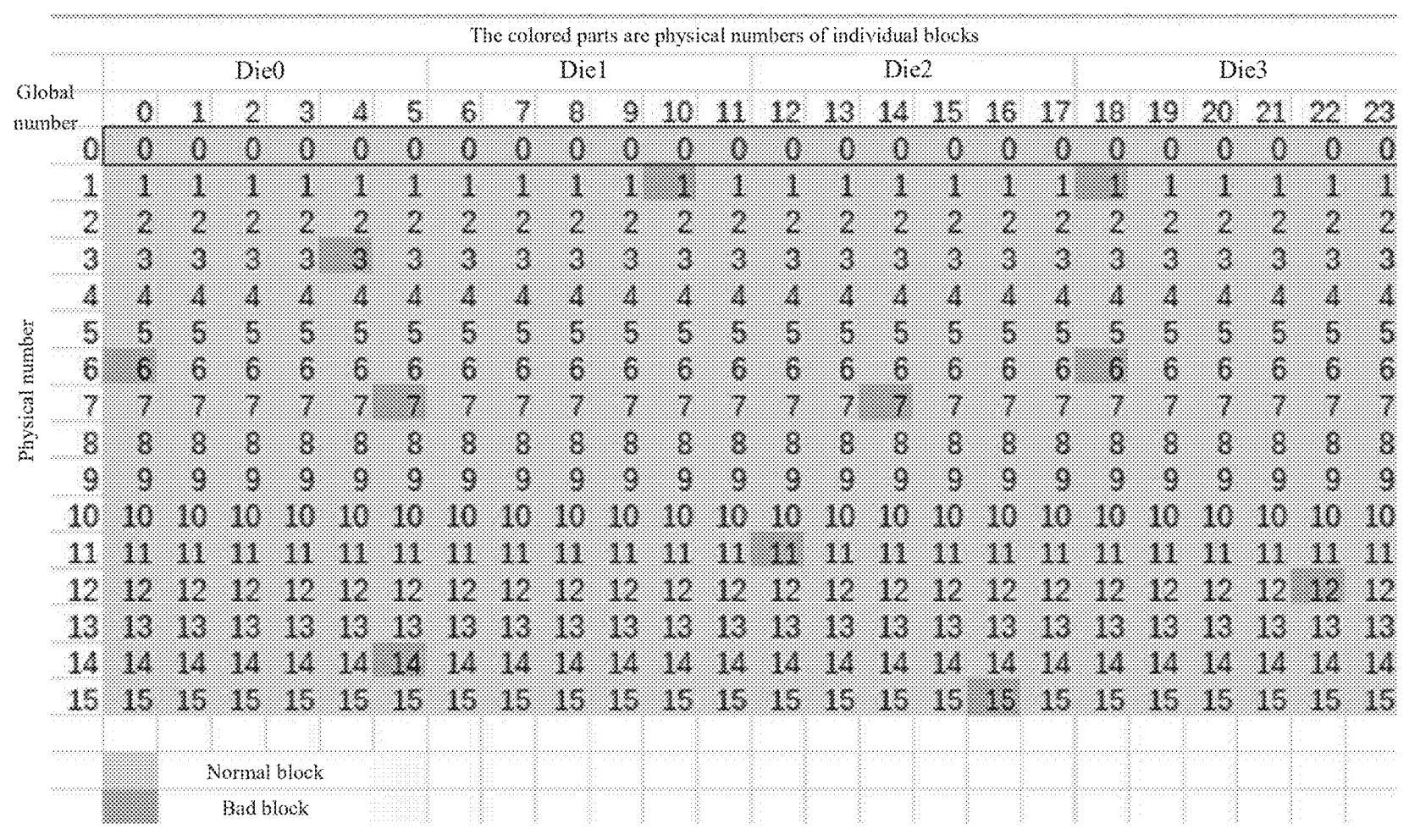

In an example, please refer to FIG. 6, which illustrates a schematic diagram of a distribution situation of physical numbers of individual blocks in at least one memory provided by an example of the present application. In this example, the at least one memory includes Die0, Die1, Die2, and Die3, and each die comprises 6 planes. The at least one memory comprises 24 planes, and the 24 planes correspond to global numbers 0 to 23 respectively. Each plane comprises 16 blocks, and the 16 blocks correspond to physical numbers 0 to 15 respectively. In some examples, the blocks included in the at least one memory may be grouped directly according to the physical numbers, so as to obtain 16 superblocks having physical numbers 0 to 15. Furthermore, the superblocks having physical numbers 1, 6 and 7 comprise two bad blocks respectively.

In some examples, the unavailable blocks further comprise blocks having data related to the memory stored therein. The data related to the memory may comprise code of the memory (code executed by the memory controller, such as code of the NAND flash) and configuration parameters of the memory (such as a configuration parameter "trim" of the NAND flash).

In the examples of the present application, the above unavailable blocks may be distributed into different superblocks through mapping, thereby avoiding a situation where unavailable blocks are concentrated in a particular superblock, which will be described in detail in the following examples.

In operation 520, map a physical number of each of the N blocks according to a global number of a plane in which each of the N blocks is located, so as to obtain a logical number of each of the N blocks.

The global number is used for distinguishing between different planes in the at least one memory, and at least two blocks having the same physical number in the N blocks are mapped to have different logical numbers.

In some examples, the N blocks are configured to store host data, a plurality of blocks having the same physical number in each of the planes constitute a group of system blocks, and the system blocks are configured to store non-host data.

The host data refers to data sent (generated) by the host. The host may be any computer device other than the memory system that generates data. In some examples, the host is coupled with the memory system comprising the controller and the at least one memory. Furthermore, the host is coupled with the controller, the controller receives and temporarily stores the host data, and then the controller stores the host data into the at least one memory.

The non-host data refers to data other than the host data, and may include data generated by the memory system and data of firmware of the memory system. In some examples, the non-host data includes at least one of the following: system data of the memory system, journal of the memory system, or root meta. The system data of the memory system comprises data required for running the memory system, e.g., data required for running the firmware. The journal of the memory system is used to record operating behaviors and operational events of the memory system. The root meta, which is also referred to as intermediary data or relay data, comprises data that describes data, and mainly comprises information that describes properties of the data, which is used to support functions such as memory location indicating, resource searching, and file recording, etc.

In some examples, each plane may comprise multiple groups of system blocks.

In some examples, the system blocks are configured to store at least one of the following data: the system data of the memory system, the journal of the memory system, and the root meta. For example, a system block in an SSD may be configured to store SSD journal, SSD system data, and root meta.

In some examples, a partition operation may be performed on the blocks in the at least one memory. The blocks are partitioned into a system data area composed of at least one group of system blocks and a host data area for storing the host data. That is, a system data area may be reserved in the at least one memory, in which no mapping of physical numbers to logical numbers is performed, and only mapping of physical numbers of blocks in the host data area is performed.

Figure 7:
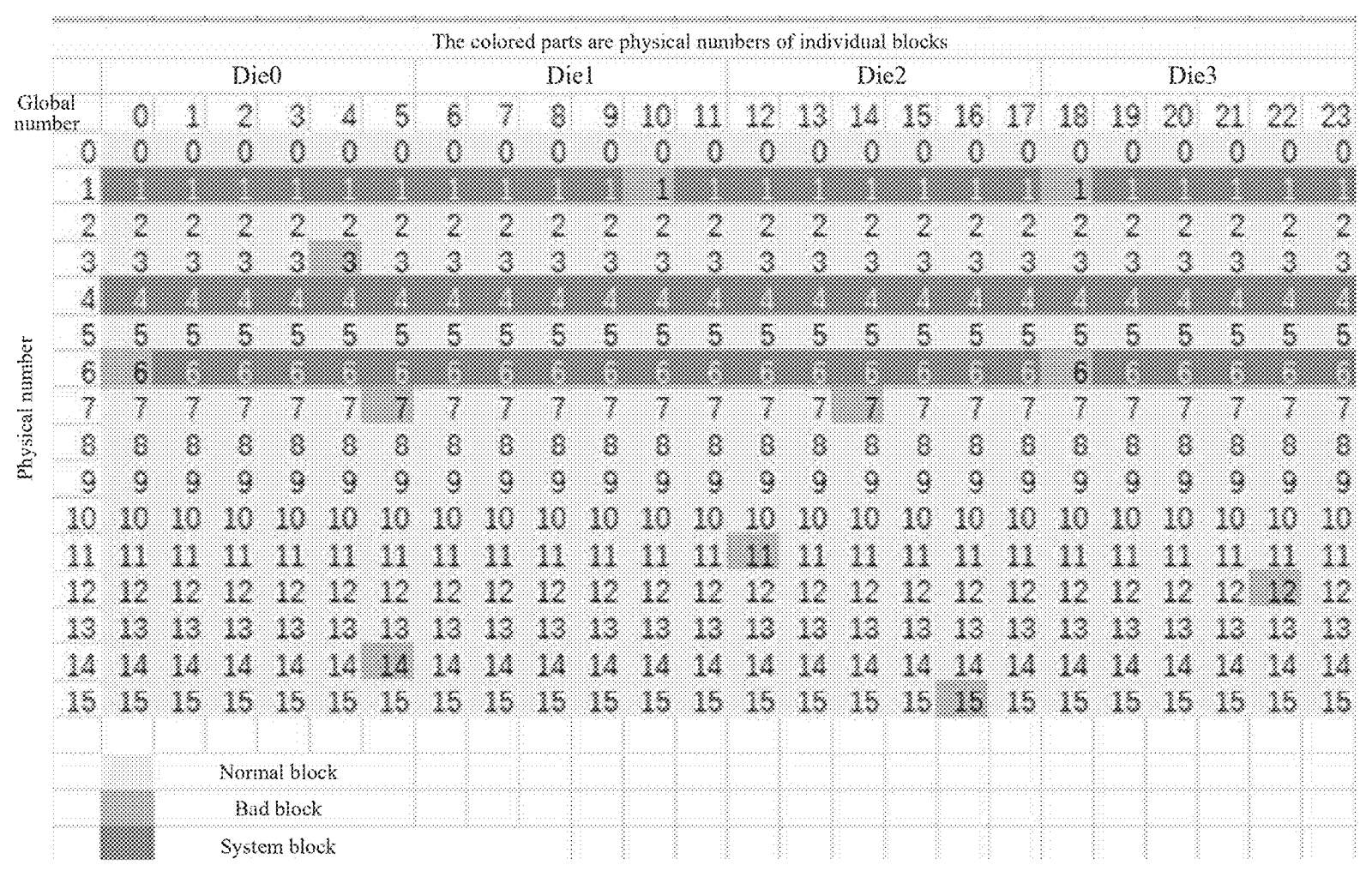

In an example, referring to FIG. 7, blocks having a physical number 1 in the at least one memory may be grouped into one group of system blocks, which are configured to store the journal; blocks having a physical number 4 are grouped into one group of system blocks, which are configured to store the system data; and blocks having a physical number 6 are grouped into one group of system blocks, which are used to store the root meta. The three groups of system blocks then constitute the system data area. Blocks other than the three groups of system blocks in the at least one memory belong to the host data area. In some examples, the above N blocks being used for storing the host data may also be expressed as the above N blocks being blocks of the host data area.

Through the above method, mapping of only the physical numbers of the blocks configured to store the host data may be performed. After the mapping, grouping for superblocks of the system data area is still performed based on physical numbers, while grouping for superblocks of the host data area is performed based on logical numbers. Distribution scrambling of the superblocks in the host data area can avoid superblocks with concentrated unavailable blocks are present in the host data area.

In some examples, for each plane in the at least one memory, the physical numbers of the blocks of the N blocks that are in the same plane may be mapped randomly without repetition within a determined range. In an example, referring to FIG. 6, if the N blocks comprise all blocks in the at least one memory, physical numbers of individual blocks in a plane having a global number 0 may be mapped randomly to integers from 0 to 15 without repetition. Moreover, physical numbers of individual blocks on remaining planes are mapped using the same method as described above.

The above method scrambles the grouping of the superblocks through random mapping. In some examples, the physical numbers may also be mapped by setting an algorithm, so that the unavailable blocks having the same physical number are distributed as evenly as possible in the superblocks grouped based on the logical numbers.

In some examples, the physical number of each of the N blocks is mapped according to the global number of the plane in which each of the N blocks is located, a shift value, a count of blocks included in the plane, and a first parameter, so as obtain the logical number of each of the N blocks.

The shift value is used to indicate an offset between logical numbers respectively corresponding to two blocks having the same physical number and being located in planes having adjacent global numbers, and the first parameter is a minimum natural number used to control the logical number of the block to be within a determined range. In an example, if the determined range of the logical number is integers from 0 to 15, the first parameter should be a minimum natural number capable of mapping the logical number to an integer from 0 to 15.

In some examples, the global number of the plane in which each of the N blocks is located is obtained according to a memory number of a memory in which each of the N blocks is located, a count of planes included in the memory, and a plane number of the plane in which each of the N blocks is located.

The memory number is used for distinguishing between different memories, and the plane number is used for distinguishing between different planes in the same memory.

In some examples, for each plane in the at least one memory, a product of the memory number of a memory in which the plane is located and the count of planes included in the memory is added to the plane number of the plane to obtain the global number of the plane.

That is, the global number of the plane is gplnid=ilun×plane_cnt+iplane, wherein ilun is the memory number of the memory in which the plane is located, plane_cnt is the count of planes included in the memory, and iplane is the plane number of the plane.

In some examples, operation 520 comprises at least one of the following sub-operations 522-526.

In sub-operation 522, for each of the N blocks, adding a product of the count of blocks included in the plane and the first parameter to the physical number of the block to obtain a first intermediate value.

That is, the first intermediate value is A=block_cnt×M+pblock, wherein block_cnt is the count of blocks included in the plane, and M is the first parameter.

In sub-operation 524, using a product of the global number of the plane in which the block is located and the shift value as a second intermediate value.

That is, the second intermediate value is B=gplnid×BLK_SHIFT_VAL, wherein gplnid is the global number of the plane in which the block is located, and BLK_SHIFT_VAL is the shift value.

In sub-operation 526, obtaining the logical number of the block according to a difference between the first intermediate value and the second intermediate value.

In some examples, the first intermediate value is subtracted from the second intermediate value to obtain the logical number of the block, that is, the logical number of the block is Iblock=B−A=(gplnidxBLK_SHIFT_VAL)−(block_cntxM+pblock)=(ilunxplane_cnt+iplane)×BLK_SHIFT_VAL−(block_cntxM+pblock).

In some examples, the second intermediate value is subtracted from the first intermediate value to obtain the logical number of the block, that is, the logical number of the block is Iblock=A−B=(block_cntxM+pblock)−(gplnidxBLK_SHIFT_VAL)=(block_cntxM+pblock)−(ilunxplane_cnt+iplane)×BLK_SHIFT_VAL.

Figure 8:
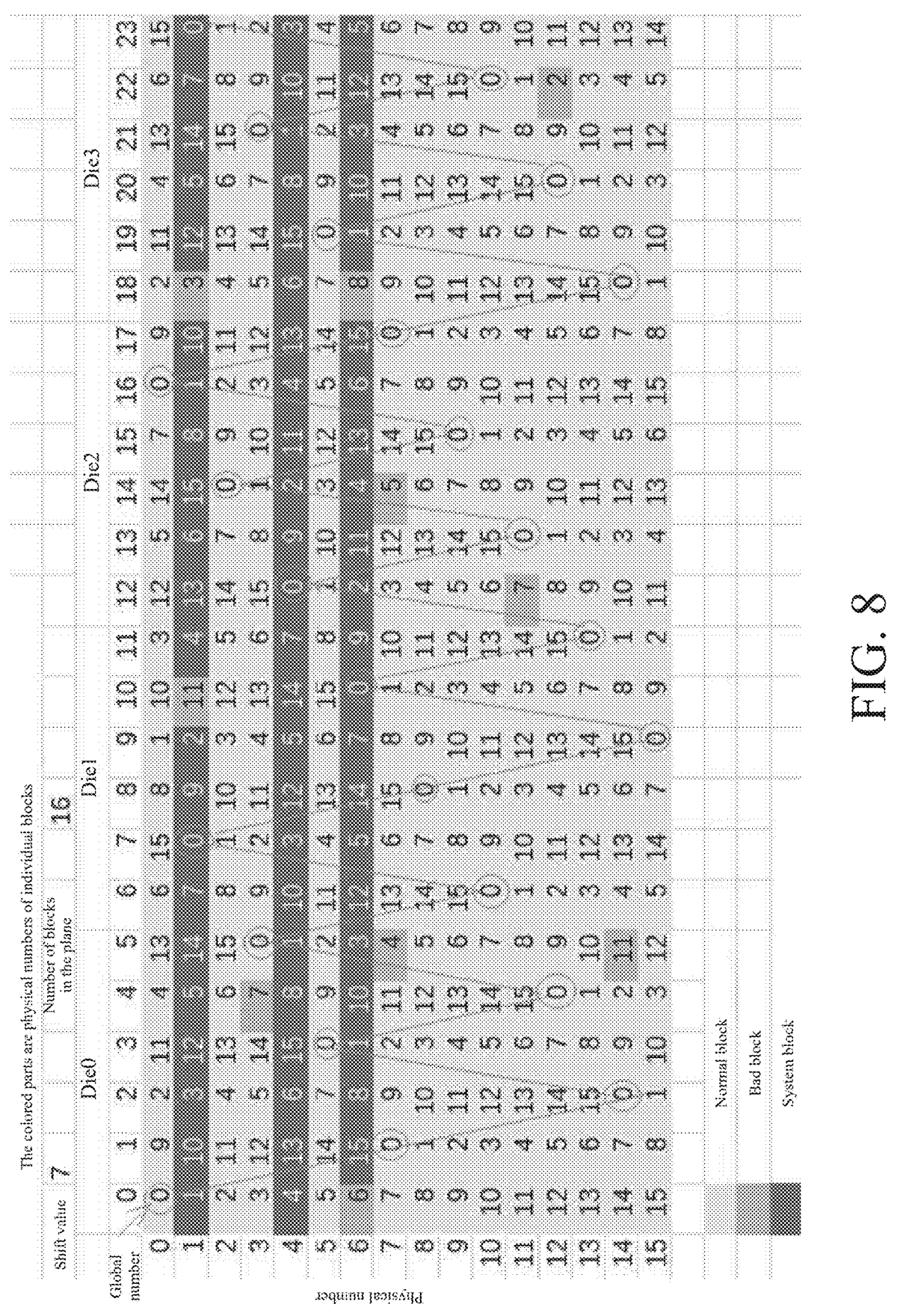

In an example, referring to FIG. 8, which illustrates a schematic diagram of a mapping relationship between physical numbers and logical numbers provided by an example of the present application. In this example, the count of planes plane_cnt included in each memory is 6, the count of blocks block_cnt included in each plane is 16, the physical numbers are integers from 0 to 15, the shift value is 7, and the determined range of the logical number is also integers from 0 to 15. The mapping of the physical number to the logical number for each block in Die0, Die1, Die2 and Die3 is performed using the above mapping formula of logical number Iblock=A−B. It can be seen that, there is an offset of 7 between the logical numbers respectively corresponding to the two blocks having the same physical number and being located in the planes having adjacent global numbers. For example, in FIG. 8, a block has a physical number 0 and is in a plane having a global number 0 is mapped to a logical number 0, and a block has a physical number 0 and is in a plane having a global number 1 is mapped to a logical number 9, in which case 7-bit offsets from 0 to 15, from 15 to 14, . . . , and from 10 to 9 occur. Furthermore, the offset may also be regarded as an offset between physical numbers of two blocks having the same logical number and being located in planes having adjacent global numbers. For example, in FIG. 8, the physical numbers of the individual blocks that each have a logical number 0 and are in planes having adjacent global numbers have a 7-bit offset.

Additionally, it is to be noted that if the above mapping pattern is employed, there is actually a two-way mapping relationship between the physical numbers and the logical numbers. If the mapping of the physical number to the logical number is performed on a certain block using the above mapping formula logical number Iblock=A−B, the logical number may be mapped to the physical number using the formula pblock=(Iblock+gplnidxBLK_SHIFT_VAL) % block_cnt=(Iblock+(ilunxplane_cnt+iplane)×BLK_SHIFT_VAL) % block_cnt. In an example, please refer to FIG. 9, which illustrates a schematic diagram of a mapping relationship between logical numbers and physical numbers provided by an example of the present application. In this example, the logical numbers are mapped using the above logical number to physical number mapping formula, with the shift value still being 7. It may be seen that, in a plane having a global number 1, physical numbers of two blocks having the same logical number has a 7-bit offset, as compared to a plane having a global number 0.

The above pattern for mapping between physical numbers and logical numbers may also be referred to a cyclic shift mapping pattern. Through this mapping pattern, different logical numbers may be uniformly assigned to blocks having the same physical number in different planes, so that a plurality of unavailable blocks having the same physical number are distributed uniformly to superblocks having different logical numbers.

It is to be noted that, the above cyclic shifting mapping pattern is only one possible mapping pattern provided by the examples of the present application for mapping a physical number to a logical number, and a person skilled in the art may also employ other mapping patterns to map a physical number to a logical number. For example, the random mapping pattern described in the above examples may be used. For another example, the above mapping formula Iblock=A−B is changed to Iblock=(A−B)×(−1)gplnid. The present application does not impose a limitation thereto.

In operation 530, the N blocks are grouped according to the logical number of each of the N blocks, so as to obtain at least two superblocks.

Each of the superblocks comprises at least two blocks, and the at least two blocks are managed in a unified manner during data reading and writing.

In some examples, the shift value is adjusted in a case that, among the at least two superblocks, there is a superblock in which a count of unavailable blocks exceeds a first threshold, wherein the unavailable blocks refer to blocks unavailable for writing host data.

The first threshold may be set by a technician as desired to, e.g., 3, 5, or 10, etc., which is not limited by the present application.

In some examples, the shift value is adjusted in a case that, among the at least two superblocks, there is a superblock in which a proportion of unavailable blocks exceeds a second threshold.

The second threshold may be set by a technician as desired to, e.g., 0.1, 0.3, or 0.5, etc., which is not limited by the present application.

In some examples, after adjusting the shift value, reperforming the operation of the mapping the physical number of each of the N blocks according to the global number of the plane in which each of the N blocks is located, a shift value, the count of blocks included in the plane, and a first parameter, so as obtain the logical number of each of the N blocks.

After the physical numbers of the N blocks are mapped to logical numbers and grouping for superblocks is performed according to the logical numbers, if there is still a situation wherein unavailable blocks are concentrated in a certain superblock, the physical numbers may be mapped to new logical numbers through the above method and grouping for superblocks is performed again to ensure that the unavailable blocks are dispersed into different superblocks.

In some examples, blocks in the N blocks that have determined logical numbers may be grouped into the same superblock. In an example, referring to FIG. 9, blocks having logical numbers 0 and 1 are grouped into the same superblock, blocks having logical numbers 2 and 3 are grouped into the same superblock, . . . , and blocks having logical numbers 14 and 15 are grouped into the same superblock, thereby obtaining 8 superblocks.

In some examples, blocks in the N blocks that have the same logical number may be grouped into the same superblock. In an example, referring to FIG. 9, 16 superblocks having logical numbers 0-15 may be acquired after the grouping for superblocks is performed using the above method. Moreover, as seen from FIG. 9, the unavailable blocks are distributed in the 16 superblocks uniformly.

Figure 9:
FIG. 9 is a schematic diagram of a mapping relationship between logical numbers and physical numbers provided by an example of the present application.

Additionally, it is to be noted that in FIG. 8 and FIG. 9, to fully illustrate that the technical solution provided by the present application is capable of dispersing the unavailable blocks having the same physical number into different superblocks, the mapping of physical numbers to logical numbers is carried out using the system blocks as the unavailable blocks. A person skilled in the art may understand that, if the system blocks and blocks for storing the host data are divided in advance, mapping of only the physical numbers of the blocks used to store the host data may be performed.

In some examples, the at least two superblocks comprise: a host superblock and a system superblock.

The host superblock is configured to store the host data, and the system superblock is configured to store non-host data.

In some examples, the N blocks are all blocks in the at least one memory, and the at least two superblocks are obtained after the N blocks are grouped according to the logical numbers. The host superblock and the system superblock may be determined from the at least two superblocks.

Additionally, it is to be noted that in the examples of the present application, the logical number may be set in a range the same as or different from that of the physical number. The technician can adjust the count of the superblocks resulting from the grouping based on the logical numbers by controlling the determined range of the logical numbers.

In an example, referring to FIG. 6, in this example, the physical numbers of the individual blocks are integers from 0 to 15, in which case the logical number may be set in a range of integers from 0 to 19. At this time, the physical number of each block may be mapped to a logical number from 0 to 19 (e.g., using the above mapping formula Iblock=A−B and controlling Iblock to range from 0 to 19 through the first parameter). In this case, a count of blocks having the same logical number is less than a count of blocks having the same physical number. 19 superblocks are obtained if the blocks having the same logical number are grouped into the same superblock. Furthermore, 16 host superblocks and 3 system superblocks may be determined from the 19 superblocks.

In an example, referring to FIG. 7, in this example, if only physical numbers of blocks other than the system blocks are mapped, the physical numbers involved in the mapping are in a range of the integers from 0 to 15, other than 1, 4, and 6. In this case, the above mapping formula Iblock=A−B may also be used to map these physical numbers involved in the mapping to logical numbers from 0 to 15. Meanwhile, as shown in FIG. 8, the logical numbers comprise 1, 4, and 6.

To sum up, if grouping for an initial superblock of the N blocks is performed based on the physical numbers, through adjustment to the determined range of the logical numbers, the N blocks may be grouped into more superblocks based on the physical numbers. Furthermore, if the N blocks are configured to store the host data, the count of the superblocks configured to store the host data may be increased through the above method.

In some examples, the host data is written to the superblocks in by skipping the unavailable blocks.

In an example, if a superblock comprises 24 blocks and there are two unavailable blocks in the 24 blocks, the two unavailable blocks are skipped during writing the host data to the superblock, in which case the host data is written to the remaining 22 blocks.

As can be seen from the above examples, a situation wherein unavailable blocks are concentrated may be avoided in the superblocks resulting from the grouping based on the logical numbers. The unavailable blocks may be distributed uniformly in different superblocks, and accordingly, counts of blocks available to store the host data in individual superblocks are substantially the same. Therefore, writing the host data to the superblocks using a strategy of directly skipping the unavailable blocks causes no large fluctuations in host data write rates of the individual superblocks, thereby guaranteeing the consistency in the write rates of the individual superblocks.

According to the technical solutions provided by the examples of the present disclosure, the physical numbers of the N blocks in the at least one memory are acquired. Then the physical number of each of the N blocks is mapped according to the global number of the plane in which each of the N blocks is located, so as to map the at least two blocks having the same physical number in the N blocks to have different logical numbers. Finally, the N blocks are grouped according to the logical numbers to obtain at least two superblocks. Blocks having the same physical number that are unavailable for writing host data may be dispersed into different superblocks, so as to guarantee the consistency in write rates of the individual superblocks for writing the host data, avoiding the occupation of over-provisioning and thus improving the service life and read-write performance of the memory.

Figure 10:
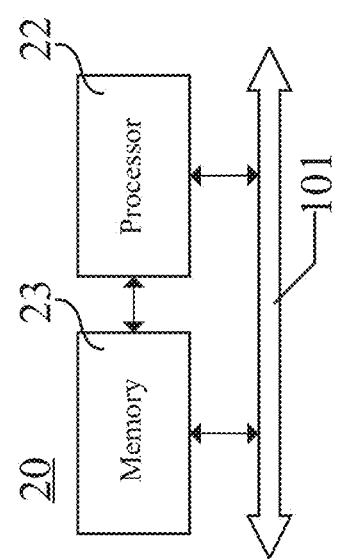
FIG. 10 is a block structural diagram of a controller provided by an example of the present application.

Please refer to FIG. 10, which illustrates a block structural diagram of a controller provided by an example of the present application.

The controller 20 comprises the memory 23 and the processor 22 coupled with the memory 23, wherein the processor 22 may be configured to run firmware to implement the above operation method of the memory controller. The memory 23 may be configured to store root meta used by the firmware The memory 23, also referred to as an internal memory or a primary memory, is configured to temporarily store computation data of the processor 22 (e.g., a microcontroller unit, CPU) and data exchanged with an external memory (e.g., a mechanical hard disk). In an example, the memory 23 may include: a ROM, a RAM, and a cache. The RAM may include a Dynamic Random Access Memory (DRAM) and a Static Random-Access Memory (SRAM), and the ROM may include an Erasable Programmable Read Only Memory (EPROM).

The memory 23 and the processor 22 transmit data via the data bus 101 and implement data exchange with an external device. In an example, during data storage, host data (not shown in FIG. 8) is first stored to the memory 23 temporarily via the data bus 101, and then the host data temporarily stored in the memory 23 is allocated by the processor 22 and finally stored to a memory (not shown in FIG. 8) coupled with the controller 20. As can be seen, the controller 20 plays the role of allocation and bridging in the process of storing the host data to the memory.

Figure 11:
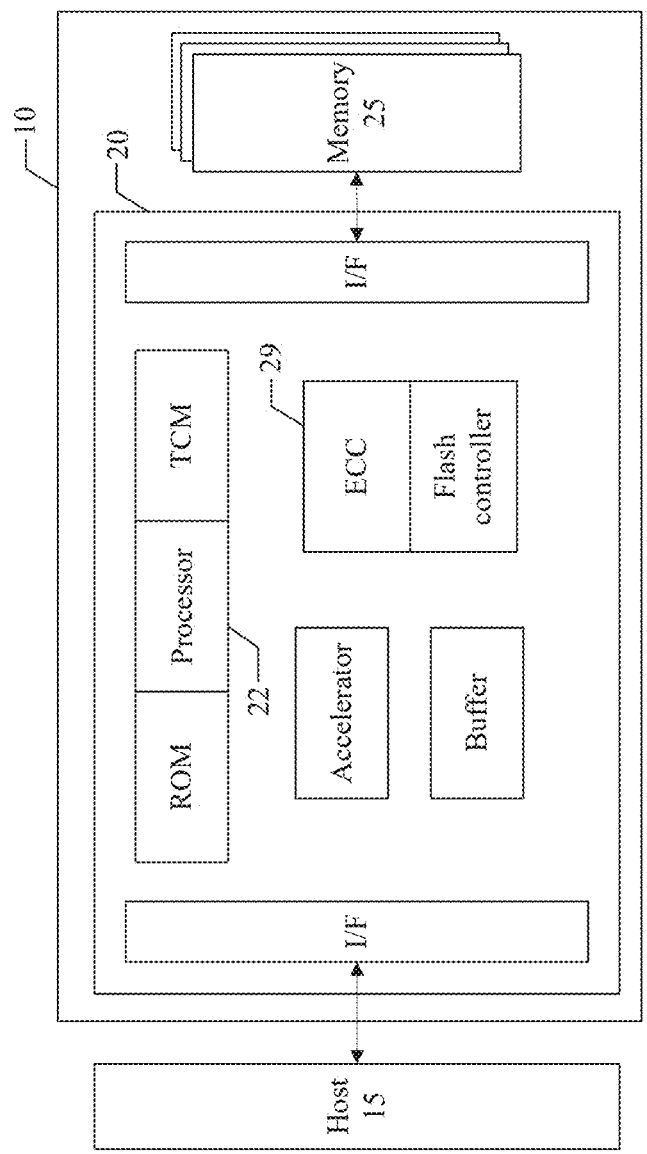
FIG. 11 is a block structural diagram of a controller provided by another example of the present application.

Please refer to FIG. 11, which illustrates a block structural diagram of a controller provided by another example of the present application.

The controller 20 may be a SOC chip in the memory system 10 (e.g., an SSD), and the controller 20 comprises the processor 22 as well as a ROM and a Tightly Coupled Memory (TCM) that are coupled with the processor 22. The processor 22 may be configured to run firmware to implement the above operation method of the memory controller. The above firmware is stored in a non-volatile memory (typically a N and Flash in the SSD), e.g., stored in at least one memory 25 coupled with the controller 20 via an I/F (interface), and is run in the TCM. The controller 20 may further comprise an accelerator, a buffer, the ECC engine 29, and a flash controller, etc., which are not limited in the present application.

The controller 20 is coupled with the host 15 via the I/F to implement data interaction between the memory system 10 and the host 15.

In some examples, a memory system is further provided, which may comprise a controller and at least one memory. The controller may be configured to run firmware to implement the above operation method of the memory controller.

Figure 12:
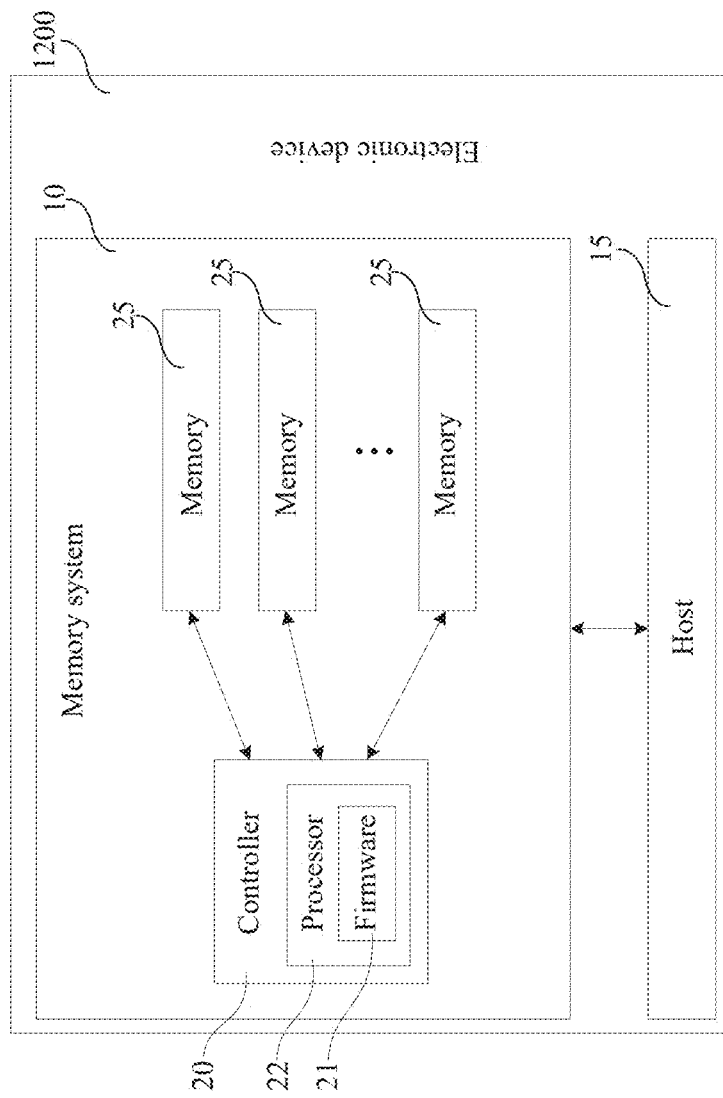
FIG. 12 is a block structural diagram of an electronic device provided by an example of the present application.

Please refer to FIG. 12, which illustrates a block structural diagram of an electronic device provided by an example of the present application.

Typically, the electronic device 1200 comprises: the memory system 10 and the host 15.

The memory system 10 may comprise the controller 20 and one or more memories 25. The memory system 10 is coupled with the host 15. The controller 20 may run the firmware 21, and the firmware 21 may be executed by one or more processors 22 of the controller 20 to implement the above operation method of the memory controller.

Detailed descriptions of specific structures of the memory system 10 and the host 15 and an interaction pattern thereof can be referred to the above examples, and are no longer repeated here.

In some examples, a computer readable storage medium is further provided. The storage medium stores a computer program which is loaded and executed by a memory system to implement the above operation method of the memory controller.

In an example, the computer readable storage medium may include a ROM, a RAM, an SSD, or an optical disk. The RAM may include a Resistance Random Access Memory (ReRAM) and a DRAM.

Examples of the present application provide an operation method of a memory controller, a device, and a storage medium. The technical solutions are as follows:

According to an aspect of the examples of the present application, an operation method of a memory controller is provided, wherein the memory controller is coupled to at least one memory, the memory comprises a plurality of planes, each plane comprises a plurality of blocks, and the method comprises:

acquiring physical numbers of N blocks in the at least one memory, the physical numbers being used for distinguishing between different blocks in the same plane, and N being an integer greater than 1;

mapping a physical number of each of the N blocks according to a global number of a plane in which each of the N blocks is located, so as to obtain a logical number of each of the N blocks, wherein the global number is used for distinguishing between different planes in the at least one memory, and at least two blocks having the same physical number in the N blocks are mapped to have different logical numbers; and grouping the N blocks according to the logical number of each of the N blocks to obtain at least two superblocks, wherein each of the superblocks comprises at least two blocks, and the at least two blocks are managed in a unified manner during data reading and writing.

According to an aspect of the examples of the present application, a controller is provided, wherein the controller comprises a memory and a processor coupled with the memory, and the processor is configured to run firmware to implement the above operation method of the memory controller.

According to an aspect of the examples of the present application, a memory system is provided, wherein the memory system comprises: a controller and at least one memory coupled with the controller, wherein the memory comprises a plurality of planes, each plane comprises a plurality of blocks, and the controller is configured to implement the above operation method of the memory controller.

According to an aspect of the examples of the present application, an electronic device is provided, wherein the electronic device comprises a host and a memory system coupled with the host, the memory system comprises a controller and at least one memory coupled with the controller, the memory comprises a plurality of planes, each plane comprises a plurality of blocks, and the controller is configured to implement the above operation method of the memory controller.

According to an aspect of the examples of the present application, a computer readable storage medium is provided, wherein the computer readable storage medium has a computer program stored therein, and the computer program is to be executed by a memory system to implement the above operation method of the memory controller.

The technical solutions provided by the examples of the present application can bring about the following technical effects:

The physical numbers of the N blocks in the at least one memory are acquired. Then the physical number of each of the N blocks is mapped according to the global number of the plane in which each of the N blocks is located, so as to map the at least two blocks having the same physical number in the N blocks to have different logical numbers. Finally, the N blocks are grouped according to the logical numbers to obtain at least two superblocks. Blocks having the same physical number that are unavailable for writing host data may be dispersed into different superblocks, so as to guarantee the consistency in write rates of the individual superblocks for writing the host data, avoiding the occupation of over-provisioning and thus improving the service life and read-write performance of the memory.

"A plurality of" mentioned herein refers to two or more. "At least one of . . . " is only an association relationship for describing associated objects, and means that three relationships may exist, for example, at least one of A or B may represent the presence of A alone, the presence of A and B simultaneously, and the presence of B alone. The character "/" generally means that associated objects before and after it have a relationship of "or".

The above descriptions are only examples of the present application, and are not used to limit the present application. Any amendments, equivalent substitutions and improvements and the like made within the spirits and principles of the present application shall be encompassed within the protection scope of the present application.

What is claimed is:

1. An operation method of a memory controller, wherein the memory controller is coupled to at least one memory, the memory comprises a plurality of planes, each plane of the plurality of planes comprises a plurality of blocks, and the method comprises:

acquiring physical numbers of N blocks in the at least one memory, the physical numbers being used for distinguishing between different blocks in a same plane, and N being an integer greater than 1;

mapping a physical number of each of the N blocks according to a global number of a plane in which each of the N blocks is located, so as to obtain a logical number of each of the N blocks, wherein the global number is used for distinguishing between different planes in the at least one memory, and at least two blocks having a same physical number in the N blocks are mapped to have different logical numbers, wherein mapping the physical number of each of the N blocks further includes mapping the physical number of each of the N blocks according to the global number of the plane in which each of the N blocks is located, a shift value, a count of blocks included in the plane, and a first parameter, so as to obtain the logical number of each of the N blocks, wherein the shift value is used to indicate an offset between logical numbers respectively corresponding to two blocks having the same physical number and being located in planes having adjacent global numbers, and the first parameter is a minimum natural number used to control the logical number of the block to be within a determined range; and grouping the N blocks according to the logical number of each of the N blocks to obtain at least two superblocks, wherein each of the superblocks comprises at least two blocks, and the at least two blocks are managed in a unified manner during data reading and writing.

2. The method of claim 1, wherein the N blocks are configured to store host data, the plurality of blocks having the same physical number in each of the planes constitute a group of system blocks, and the group of system blocks are configured to store non-host data.

3. The method of claim 1, wherein the at least two superblocks include:
a host superblock configured to store host data; and
a system superblock configured to store non-host data.

4. The method of claim 1, wherein the mapping the physical number of each of the N blocks according to the global number of the plane in which each of the N blocks is located, the shift value, the count of blocks included in the plane, and the first parameter, so as obtain the logical number of each of the N blocks further includes:
for each of the N blocks, adding a product of the count of blocks included in the plane and the first parameter to the physical number of each of the N blocks to obtain a first intermediate value;
using a product of the global number of the plane in which each of the N blocks is located and the shift value as a second intermediate value; and
obtaining the logical number of each of the N blocks according to a difference between the first intermediate value and the second intermediate value.

5. The method of claim 1, further including:
adjusting the shift value in a case that, among the at least two superblocks, there is a superblock in which a count of unavailable blocks exceeds a first threshold, wherein the unavailable blocks refer to blocks unavailable for writing host data; and
after adjusting the shift value, reperforming the mapping the physical number of each of the N blocks according to the global number of the plane in which each of the N blocks is located, the shift value, the count of blocks included in the plane, and the first parameter, so as obtain the logical number of each of the N blocks.

6. The method of claim 1, before the mapping the physical number of each of the N blocks according to the global number of the plane in which each of the N blocks is located, so as to obtain the logical number of each of the N blocks, further including obtaining the global number of the plane in which each of the N blocks is located according to a type number of the at least one memory in which each of the N blocks is located, a count of planes included in the at least one memory, and a plane number of the plane in which each of the N blocks is located, wherein the type number is used for distinguishing between different memories, and the plane number is used for distinguishing between the different planes in a same memory.

7. The method of claim 1, wherein the grouping the N blocks according to the logical number of each of the N blocks to obtain the at least two superblocks further includes grouping blocks having a same logical number in the N blocks into a same superblock.

8. The method of claim 1, wherein the N blocks include a plurality of unavailable blocks having the same physical number, and the plurality of unavailable blocks refer to blocks unavailable for writing host data.

9. The method of claim 8, further including writing the host data to the superblocks by skipping the plurality of unavailable blocks.

10. A memory controller, comprising:
a memory; and
a processor coupled with the memory, wherein the processor is configured to run firmware to implement an operation method of the memory controller, wherein the memory controller is coupled to at least one memory, the at least one memory comprises a plurality of planes, each plane of the plurality of planes comprises a plurality of blocks, and the method comprises:
acquiring physical numbers of N blocks in the at least one memory, the physical numbers being used for distinguishing between different blocks in a same plane, and N being an integer greater than 1;
obtaining a global number of a plane in which each of the N blocks is located according to a type number of the memory in which each of the N blocks is located, a count of planes included in the memory, and a plane number of the plane in which each of the N blocks is located, wherein the type number is used for distinguishing between different memories, and the plane number is used for distinguishing between different planes in a same memory;
mapping a physical number of each of the N blocks according to the global number of the plane in which each of the N blocks is located, so as to obtain a logical number of each of the N blocks, wherein the global number is used for distinguishing between the different planes in the at least one memory, and at least two blocks having a same physical number in the N blocks are mapped to have different logical numbers; and
grouping the N blocks according to the logical number of each of the N blocks to obtain at least two superblocks, wherein each of the superblocks comprises at least two blocks, and the at least two blocks are managed in a unified manner during data reading and writing.

11. The memory controller of claim 10, wherein the N blocks are configured to store host data, the plurality of blocks having the same physical number in each of the planes constitute a group of system blocks, and the group of system blocks are configured to store non-host data.

12. The memory controller of claim 10, wherein the at least two superblocks include:
a host superblock configured to store host data; and
a system superblock configured to store non-host data.

13. The memory controller of claim 10, wherein the mapping the physical number of each of the N blocks according to the global number of the plane in which each of the N blocks is located, so as to obtain the logical number of each of the N blocks further includes mapping the physical number of each of the N blocks according to the global number of the plane in which each of the N blocks is located, a shift value, a count of blocks included in the plane, and a first parameter, so as obtain the logical number of each of the N blocks,
    wherein the shift value is used to indicate an offset between logical numbers respectively corresponding to two blocks having the same physical number and being located in planes having adjacent global numbers, and the first parameter is a minimum natural number used to control the logical number of the block to be within a determined range.

14. The memory controller of claim 13, wherein the mapping the physical number of each of the N blocks according to the global number of the plane in which each of the N blocks is located, the shift value, the count of blocks included in the plane, and the first parameter, so as obtain the logical number of each of the N blocks further includes:
    for each of the N blocks, adding a product of the count of blocks included in the plane and the first parameter to the physical number of each of the N blocks to obtain a first intermediate value;
    using a product of the global number of the plane in which each of the N blocks is located and the shift value as a second intermediate value; and
    obtaining the logical number of each of the N blocks according to a difference between the first intermediate value and the second intermediate value.

15. The memory controller of claim 13, further including:
    adjusting the shift value in a case that, among the at least two superblocks, there is a superblock in which a count of unavailable blocks exceeds a first threshold, wherein the unavailable blocks refer to blocks unavailable for writing host data; and
    after adjusting the shift value, reperforming the mapping the physical number of each of the N blocks according to the global number of the plane in which each of the N blocks is located, the shift value, the count of blocks included in the plane, and the first parameter, so as obtain the logical number of each of the N blocks.

16. The memory controller of claim 10, wherein the grouping the N blocks according to the logical number of each of the N blocks to obtain the at least two superblocks further includes grouping blocks having a same logical number in the N blocks into a same superblock.

17. The memory controller of claim 10, wherein the N blocks include a plurality of unavailable blocks having the same physical number, and the unavailable blocks refer to blocks unavailable for writing host data.

18. A memory system, comprising:
    a memory controller; and
    at least one memory coupled with the memory controller, wherein the memory comprises a plurality of planes, each plane of the plurality of planes comprises a plurality of blocks, and the memory controller is configured to implement an operation method, and the method comprises:
        acquiring physical numbers of N blocks in the at least one memory, the physical numbers being used for distinguishing between different blocks in a same plane, and N being an integer greater than 1;
        mapping a physical number of each of the N blocks according to a global number of a plane in which each of the N blocks is located, so as to obtain a logical number of each of the N blocks, wherein the global number is used for distinguishing between different planes in the at least one memory, and at least two blocks having a same physical number in the N blocks are mapped to have different logical numbers, wherein mapping the physical number of each of the N blocks further includes mapping the physical number of each of the N blocks according to the global number of the plane in which each of the N blocks is located, a shift value, a count of blocks included in the plane, and a first parameter, so as to obtain the logical number of each of the N blocks, wherein the shift value is used to indicate an offset between logical numbers respectively corresponding to two blocks having the same physical number and being located in planes having adjacent global numbers, and the first parameter is a minimum natural number used to control the logical number of the block to be within a determined range; and
        grouping the N blocks according to the logical number of each of the N blocks to obtain at least two superblocks, wherein each of the superblocks comprises at least two blocks, and the at least two blocks are managed in a unified manner during data reading and writing.

19. The memory system of claim 18, wherein the N blocks are configured to store host data, the plurality of blocks having the same physical number in each of the planes constitute a group of system blocks, and the group of system blocks are configured to store non-host data.

20. The memory system of claim 18, wherein the at least two superblocks include:
    a host superblock configured to store host data; and
    a system superblock configured to store non-host data.

* * * * *